US012703046B2

(12) United States Patent
Bai et al.

(10) Patent No.: US 12,703,046 B2
(45) Date of Patent: Aug. 11, 2026

(54) METHOD FOR ADJUSTING SWINGING OF GALVANOMETER AND RELATED DEVICES

(71) Applicant: Guangzhou Diligine Photonics Co., Ltd., Guangzhou (CN)

(72) Inventors: Tianxiang Bai, Guangzhou (CN); Pin Xie, Guangzhou (CN); Fengshi Cai, Guangzhou (CN)

(73) Assignee: GUANGZHOU DILIGINE PHOTONICS CO., LTD., Guangzhou (CN)

( * ) Notice: Subject to any disclaimer, the term of this patent is extended or adjusted under 35 U.S.C. 154(b) by 775 days.

(21) Appl. No.: 18/138,187

(22) Filed: Apr. 24, 2023

(65) Prior Publication Data

US 2024/0131623 A1 Apr. 25, 2024
US 2024/0227073 A9 Jul. 11, 2024

(30) Foreign Application Priority Data

Oct. 24, 2022 (CN) ......................... 202211302330.7

(51) Int. Cl.
*B23K 26/082* (2014.01)
*B23K 26/21* (2014.01)

(52) U.S. Cl.
CPC ............ *B23K 26/082* (2015.10); *B23K 26/21* (2015.10)

(58) Field of Classification Search
None
See application file for complete search history.

(56) References Cited

U.S. PATENT DOCUMENTS 9,720,224 B2 * 8/2017 Imai ..................... B23K 26/082
2021/0323088 A1 10/2021 Yokoyama et al.
(Continued)

FOREIGN PATENT DOCUMENTS

CN 110345867 A 10/2019
CN 114309976 A 4/2022
(Continued)

OTHER PUBLICATIONS

Extended European search report dated Apr. 30, 2024 received in European Patent Application No. 23169928.1.
(Continued)

*Primary Examiner* — Courtney D Heinle
*Assistant Examiner* — Danielle M. Christensen
(74) *Attorney, Agent, or Firm* — Scully, Scott, Murphy & Presser, P.C.

(57) ABSTRACT

A method for adjusting swinging of a galvanometer is provided in implementations of the disclosure. The method includes the following operations. Guide a processing laser to a laser processing surface via a first galvanometer, and establish a first correspondence between a reference coordinate system of the laser processing surface and coordinate-ranges of swinging angles of the first galvanometer. Perform region division on the laser processing surface in the reference coordinate system to obtain P calibrating selected-regions of the laser processing surface. Determine coordinate of a swinging angle of the first galvanometer corresponding to one of target points in Q calibrating selected-regions in the P calibrating selected-regions according to the first correspondence, to obtain coordinates of Q swinging angles of the first galvanometer. Establish a second correspondence between the reference coordinate system of the laser processing surface and coordinate-ranges of swinging angles of a second galvanometer.

20 Claims, 7 Drawing Sheets

(56) References Cited

U.S. PATENT DOCUMENTS

2022/0016730 A1 * 1/2022 Stambke .............. G01B 21/045
2022/0055147 A1 2/2022 Yokoyama et al.

FOREIGN PATENT DOCUMENTS

CN 114842496 A 8/2022
JP 2002301585 A * 10/2002 ............. B23K 26/02

OTHER PUBLICATIONS

The first office action issued in corresponding CN application No. 202211302330.7 dated Apr. 1, 2025.

* cited by examiner

METHOD FOR ADJUSTING SWINGING OF GALVANOMETER AND RELATED DEVICES

CROSS-REFERENCE TO RELATED APPLICATIONS

This application claims priority under 35 U.S.C. § 119(a) to Chinese Patent Application No. 202211302330.7, filed Oct. 24, 2022, the entire disclosure of which is incorporated herein by reference.

TECHNICAL FIELD

This disclosure relates to the field of laser processing technology, particularly to a method for adjusting swinging of a galvanometer and related devices.

BACKGROUND

In practical application, for galvanometer laser welding, a galvanometer and a control system of the galvanometer are additionally disposed on the basis of collimation-focus laser welding. The galvanometer is used to realize rapid scanning and deflection of laser, and thus accessibility of the laser is improved. In combination with a powerful and professional graphic processing software, program-controlled instantaneous multi-point welding is realized. Therefore, production efficiency and flexibility are effectively improved. However, due to rapid deflection of a welding light-spot in galvanometer laser welding, a new requirement is put forward for real-time detection of a penetration depth in a welding process.

For a galvanometer laser welding system, a direction and a position of processing laser change constantly in the welding process. Even if an optical path is strictly adjusted to make measuring light coincide accurately with the processing laser after the measuring light and the processing laser pass through a beam combiner, due to different aberrations produced by a field lens for light of different wavelengths, the measuring light and the processing laser do not coincide on a welding surface, and additionally, the greater the measuring light and the processing laser deviate from a central point of the surface, the greater the measuring light deviates from the processing laser. If a second galvanometer is used to scan and deflect the measuring light, the measuring light does not coincide with the processing laser after passing through the beam combiner, and an entering direction and an entering spot of the measuring light into a laser welding galvanometer are different from those of the processing laser, and thus it is necessary to reconsider in real time an emitting direction of the measuring light. In addition, an aberration of the measuring light differs from that of the processing light produced by the field lens. Therefore, the entire system becomes more complex, and it is difficult to find a melt pool and a keyhole for the measuring light, i.e., real-time alignment between the measuring light and the keyhole has become a new calibration problem. The problem of how to achieve real-time alignment between the measuring light and the keyhole needs to be solved urgently.

SUMMARY

In a first aspect, a method for adjusting swinging of a galvanometer is provided in implementations of the disclosure. The method for adjusting swinging of a galvanometer is applied to a device for adjusting swinging of a galvanometer. The device for adjusting swinging of a galvanometer includes a first galvanometer and a second galvanometer, where the first galvanometer is configured to adjust a pointing direction of processing laser entering from a laser processing head, and the second galvanometer is configured to adjust a pointing direction of measuring light entering from an optical sensor. The method includes the following operations. Guide the processing laser to a laser processing surface via the first galvanometer, and establish a first correspondence between a reference coordinate system of the laser processing surface and coordinate-ranges of swinging angles of the first galvanometer. Perform region division on the laser processing surface in the reference coordinate system to obtain P calibrating selected-regions of the laser processing surface, where P is an integer greater than 1. Determine target points in Q calibrating selected-regions in the P calibrating selected-regions, and determining a coordinate of a swinging angle of the first galvanometer corresponding to one of the target points in the Q calibrating selected-regions according to the first correspondence, to obtain coordinates of Q swinging angles of the first galvanometer, where Q is an integer greater than 1 and less than or equal to P. Guide the measuring light to the laser processing surface via the second galvanometer and the first galvanometer adjusted according to the Q swinging angles of the first galvanometer, and determining coordinate-ranges of Q swinging angles of the second galvanometer. Establish a second correspondence between the reference coordinate system of the laser processing surface and coordinate-ranges of swinging angles of the second galvanometer according to the coordinates of the Q swinging angles of the first galvanometer and the coordinate-ranges of the Q swinging angles of the second galvanometer, to determine a swinging coordinate-range of the second galvanometer in the reference coordinate system.

In a second aspect, a device for adjusting swinging of a galvanometer is provided in implementations of the disclosure. The device for adjusting swinging of a galvanometer includes a processor, a memory, a communication interface, and one or more programs. The one or more programs are stored in the memory and are configured to be executed by the processor. The programs include instructions for performing operations in the first aspect of implementations of the disclosure.

In a third aspect, a non-transitory computer-readable storage medium is provided in implementations of the disclosure. The computer storage medium is configured to store a computer program used for performing electronic data interchange. The computer program enables a computer to execute part or all of operations in the first aspect of implementations of the disclosure.

BRIEF DESCRIPTION OF THE DRAWINGS

In order to describe technical solutions in implementations of the disclosure or the related art more clearly, the following will give a brief introduction to the accompanying drawings required for describing the implementations or the related art. Apparently, the accompanying drawings described hereinafter are merely some implementations of the disclosure. Based on these drawings, those of ordinary skill in the art can also obtain other drawings without creative effort.

DETAILED DESCRIPTION

In order to make ordinary skill in the art understand the disclosure well, the following describes clearly and completely the technical solutions in implementations of the disclosure with reference to the accompanying drawings in implementations of the disclosure. Apparently, the implementations described are merely some rather than all of implementations of the present disclosure. All other implementations obtained by ordinary skill in the art based on the implementations described in the disclosure without creative efforts shall belong to the protection scope of the disclosure.

The terms "first", "second", and the like used in the specification, the claims, and the accompany drawings of the disclosure are used to distinguish different objects rather than describe a particular order. In addition, the terms "comprise" and "have" as well as variations thereof are intended to cover non-exclusive inclusion. For example, a process, a method, a system, a product or a device that include a series of operations or units include, but are not limited to, the listed operations or units, optionally also include steps or units that are not listed, or optionally also include other operations or units that are inherent to the process, the method, the system, the product or the device.

The reference herein to "implementations" means that specific features, structures or characteristics described in conjunction with implementations may be included in at least one implementation of the disclosure. The phrase appearing in various positions in the specification does not necessarily refer to the same implementation, nor is it an independent or alternative implementation mutually exclusive with other implementations. Those skilled in the art explicitly and implicitly understand that the implementations described herein can be combined with other implementations.

Implementations of the disclosure are described in detail below.

Figure 1:
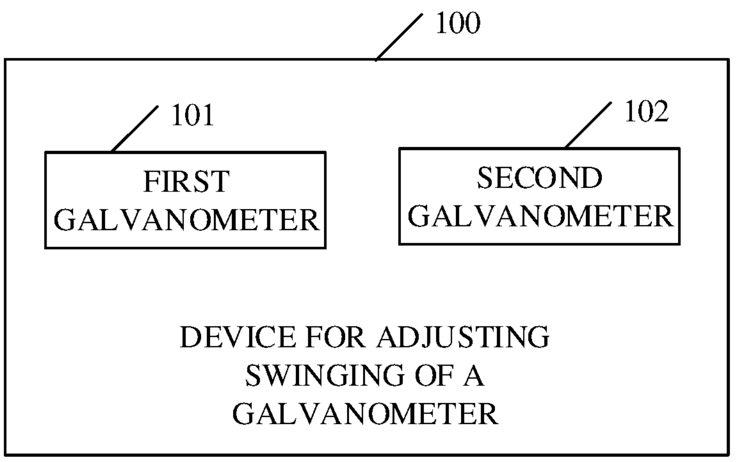
FIG. 1 is a schematic structural diagram of a device for adjusting swinging of a galvanometer provided in implementations of the disclosure.
Figure 2:
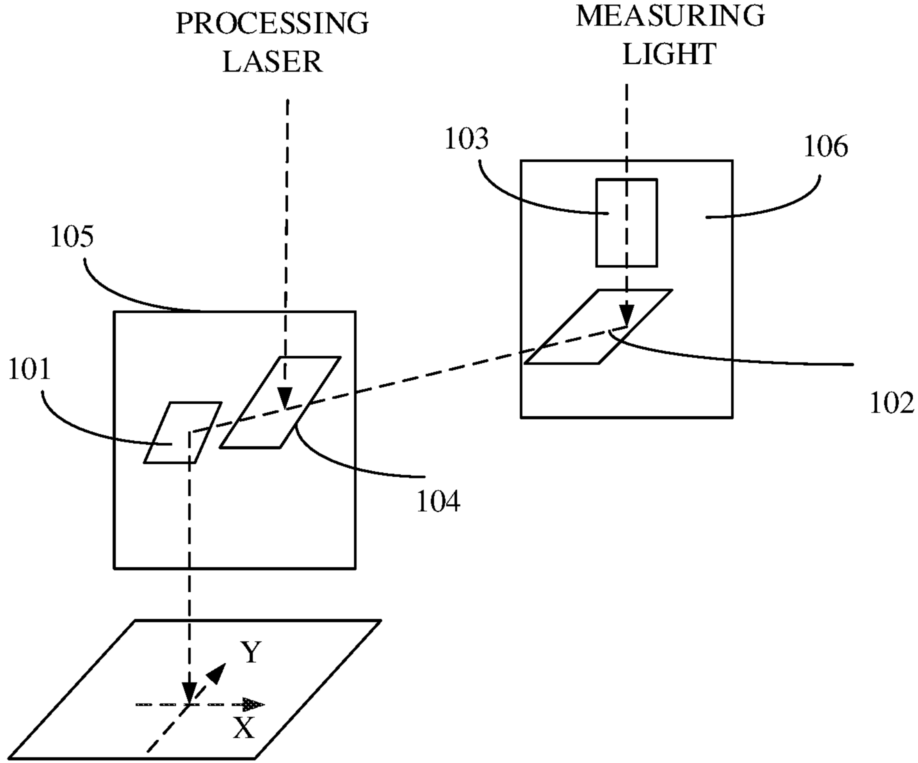
FIG. 2 is a schematic structural diagram of another device for adjusting swinging of a galvanometer provided in implementations of the disclosure.

Refer to FIG. 0.1 and FIG. 2, FIG. 0.1 and FIG. 2 are schematic structural diagrams of devices for adjusting swinging of a galvanometer provided in implementations of the disclosure. A device 100 for adjusting swinging of a galvanometer in FIG. 1 includes a first galvanometer 101 and a second galvanometer 102. Furthermore, as illustrated in FIG. 2, a laser processing head with the first galvanometer 101 is configured to input processing laser, and the second galvanometer 102 is configured to input measuring light. The device 100 for adjusting swinging of a galvanometer may further include a collimator 103 and a combiner 104, where the collimator 103 is configured to collimate the measuring light, and the combiner 104 is configured to combine the processing laser with a light beam from the second galvanometer 102.

In implementations of the disclosure, the device 100 for adjusting swinging of a galvanometer may include a laser processing head 105, an optical sensor 106, and the second galvanometer 102, where the laser processing head 105 is provided with the first galvanometer 101, and the optical sensor 106 is connected with the laser processing head 105. That is, the laser processing head 105 may include the first galvanometer 101 and the combiner 104, and the optical sensor 106 may include the collimator 103 and the second galvanometer 102.

The laser processing head 105 with the first galvanometer 101 may be configured to input the processing laser, and guide the processing laser to a laser processing surface via the first galvanometer 101 inside the laser processing head 105. The laser processing head 105 is configured to adjust a pointing direction of the processing laser through swinging of the first galvanometer 101 when adjusting a processing path of laser.

The optical sensor 106 may be configured to output the measuring light to the laser processing head 105. Generally, the processing laser and the measuring light are designed to have a coaxial optical path. In this way, during processing of the processing laser, the measuring light can be maintained to be coincided and aligned with the processing laser. Furthermore, during actual processing, a signal of the measuring light reflected by the laser processing surface can be effectively detected and obtained by the optical sensor.

During actual processing in an implementation, the measuring light may be measuring laser in one case. The measuring laser can be turned off, and is only used for calibration in the early stage. In another case, the measuring laser can stay on to track processing of the processing laser. As such, the optical sensor can not only detect the processing laser reflected by the laser processing surface, but also detect the measuring laser reflected by the laser processing surface, so that the optical sensor can respectively identify and process related signals.

In the above two cases, in order to detect effectively processing quality of the processing laser, the measuring laser is necessary to be coincided and aligned with the processing laser. Therefore, a device (galvanometer) for adjusting turning of an optical path involved in an optical path is required to be calibrated. The disclosure thereby relates to coordinate calibration of the first galvanometer and the second galvanometer. Furthermore, coincidence and alignment of optical paths are performed by controlling swinging angles of galvanometers.

Figure 3:
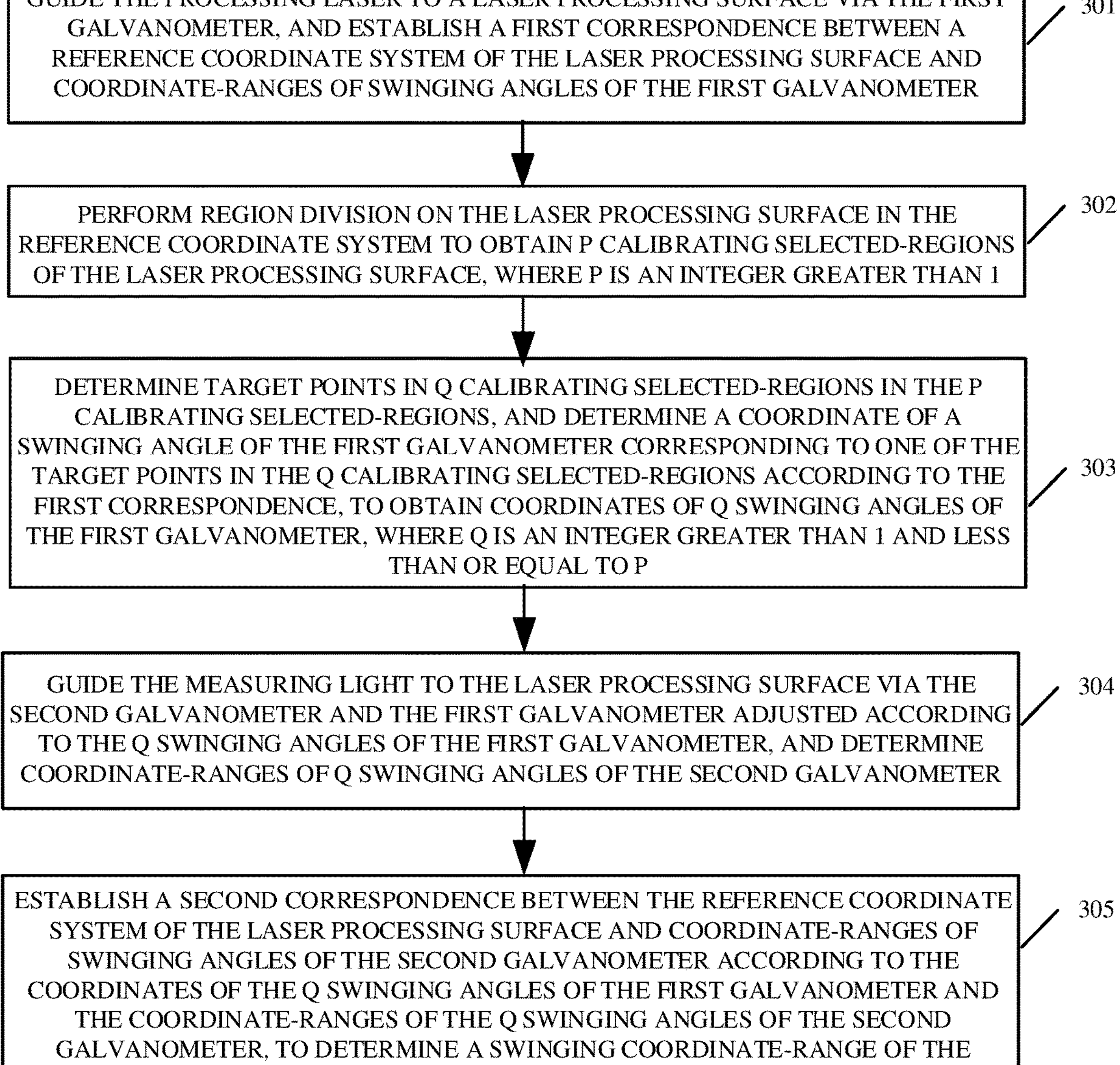
FIG. 3 is a flowchart of a method for adjusting swinging of a galvanometer provided in implementations of the disclosure.

Refer to FIG. 3, FIG. 3 is a flowchart of a method for adjusting swinging of a galvanometer provided in implementations of the disclosure. The method is applied to the device for adjusting swinging of a galvanometer illustrated in FIG. 1 and FIG. 2. The device for adjusting swinging of a galvanometer includes a first galvanometer and a second galvanometer. The first galvanometer is configured to adjust a pointing direction of processing laser entering from a laser processing head, and the second galvanometer is configured to adjust a pointing direction of measuring light entering from an optical sensor. As illustrated in the flowchart, the method for adjusting swinging of a galvanometer includes operations at 301 to 305.

At 301, guide the processing laser to a laser processing surface via the first galvanometer, and establish a first correspondence between a reference coordinate system of the laser processing surface and coordinate-ranges of swinging angles of the first galvanometer.

The laser processing surface can correspond to one reference coordinate system.

In implementations of the disclosure, the first galvanometer may be fixed. If the first galvanometer is fixed, the processing laser can be guided to the laser processing surface via the first galvanometer, and then the first correspondence between the reference coordinate system of the laser processing surface and the coordinate-ranges of the swinging angles of the first galvanometer can be established.

At 302, perform region division on the laser processing surface in the reference coordinate system to obtain P calibrating selected-regions of the laser processing surface, where P is an integer greater than 1.

In implementations of the disclosure, a virtual plane or a virtual stereogram can be set based on the reference coordinate system. Next, region division are performed on the laser processing surface in the reference coordinate system based on the virtual plane or the virtual stereogram to obtain the P calibrating selected-regions of the laser processing surface, where P is an integer greater than 1.

In implementations of the disclosure, region division can be understood as lattice distribution or linear array distribution. Region division can be applied to a two-dimensional plane or a three-dimensional space.

At 303, determine target points in Q calibrating selected-regions in the P calibrating selected-regions, and determine a coordinate of a swinging angle of the first galvanometer corresponding to one of the target points in the Q calibrating selected-regions according to the first correspondence, to obtain coordinates of Q swinging angles of the first galvanometer, where Q is an integer greater than 1 and less than or equal to P.

During actual implementation, Q is an integer greater than 1 and less than or equal to P, i.e., some or all calibrating selected-regions can be selected for calibration.

Specifically, the target points in the Q calibrating selected-regions in the P calibrating selected-regions can be determined, where the target point may be one or more. For example, if the calibrating selected-regions are virtual planes, the target points may be vertexes of the virtual planes, and if the calibrating selected-regions are virtual cuboids, the target points may be vertexes of the virtual cuboids. Next, the coordinate of the swinging angle of the first galvanometer corresponding to said one of the target points in the Q calibrating selected-regions is determined according to the first correspondence, to obtain the coordinates of the Q swinging angles of the first galvanometer, where Q is an integer greater than 1 and less than or equal to P. It can be understood that, when Q is equal to P, the whole area in the whole reference coordinate system is calibrated.

At 304, guide the measuring light to the laser processing surface via the second galvanometer and the first galvanometer adjusted according to the Q swinging angles of the first galvanometer, and determine coordinate-ranges of Q swinging angles of the second galvanometer.

According to implementations of the disclosure, during actual implementation, the measuring light can be guided to the laser processing surface via the second galvanometer and the first galvanometer adjusted according to the Q swinging angles of the first galvanometer, to determine coordinate-ranges of Q swinging angles of the second galvanometer. Furthermore, it is convenient to establish subsequently a second correspondence between the reference coordinate system of the laser processing surface and coordinate-ranges of swinging angles of the second galvanometer.

At 305, establish a second correspondence between the reference coordinate system of the laser processing surface and coordinate-ranges of swinging angles of the second galvanometer according to the coordinates of the Q swinging angles of the first galvanometer and the coordinate-ranges of the Q swinging angles of the second galvanometer, to determine a swinging coordinate-range of the second galvanometer in the reference coordinate system.

In implementations of the disclosure, the second correspondence between the reference coordinate system of the laser processing surface and the coordinate-ranges of the swinging angles of the second galvanometer can be established according to the coordinates of the Q swinging angles of the first galvanometer and the coordinate-ranges of the Q swinging angles of the second galvanometer. That is, in an application scenario with two galvanometers, before the second galvanometer performs calibration, region division can be performed on the laser processing surface, and next the first galvanometer can be calibrated in different regions, and then the correspondence between the reference coordinate system of the whole laser processing surface and the coordinate-ranges of the swinging angles of the second galvanometer can be established. As such, real-time alignment between the measuring light and an actual processing position (maybe a position of a keyhole of laser welding) of the processing laser can be realized.

During actual implementation, calibration with two points correspond to a one-dimensional linear relationship, multiple points that enclose a certain planar-region form a calibration relationship in two-dimensional plane, and a calibration relationship in three-dimensional space can be formed by multiple points that enclose a space.

Implementations of the disclosure can be applied to at least one of the following scenarios: laser processing, which includes laser welding, laser cutting, laser 3D printing, etc., but application scenarios are not limited here.

Optionally, operation 302 of performing region division on the laser processing surface in the reference coordinate system to obtain the P calibrating selected-regions of the laser processing surface can be implemented by dividing the laser processing surface into four quadrants by taking a first preset center-point as a coordinate origin, a scanning direction of an X mirror as an x axis, and a scanning direction of a Y mirror as a y axis, and dividing equally a surface in any one quadrant into M*M squares, where each square corresponds to one calibrating selected-region, and M is an integer greater than 1.

The first preset center-point can be a pre-configured point or a system default point. For example, any point in the laser processing surface can be taken as the first preset center-point. Generally, a single galvanometer has an X mirror and a Y mirror. Deflection along x axis in the laser processing surface is realized via the X mirror, and deflection along y axis in the laser processing surface is realized via the Y mirror.

Specifically, the laser processing surface is divided into four quadrants by taking the first preset center-point as the coordinate origin, a scanning direction of an X mirror as an x axis, and a scanning direction of a Y mirror as a y axis, and the surface in any one quadrant is equally divided into M*M squares, where each square corresponds to one calibrating selected-region, and M is an integer greater than 1. For example, if M is 3, 3*3 squares can be obtained.

Optionally, operation 303 of determining the target points in the Q calibrating selected-regions in the P calibrating selected-regions, and determining the coordinate of the swinging angle of the first galvanometer corresponding to said one of the target points in the Q calibrating selected-regions according to the first correspondence may include A31 to A32.

At A31, select the Q calibrating selected-regions in the P calibrating selected-regions.

At A32, select a target point in each of the Q calibrating selected-regions, and determine the coordinate of the swinging angle of the first galvanometer corresponding to the target point in the Q calibrating selected-regions according to the target point and the first correspondence.

During actual implementation, the Q calibrating selected-regions are selected from the P calibrating selected-regions, and the Q calibrating selected-regions are any Q calibrating selected-regions in the P calibrating selected-regions. Next, the target point can be selected from each of the Q calibrating selected-regions, and the target point may be one or more, such as vertexes of a region where the target point is located. Furthermore, the coordinate of the swinging angle of the first galvanometer corresponding to the target point in the Q calibrating selected-regions is determined according to the target point and the first correspondence.

Optionally, operation 305 of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system can be implemented as follows. Establish the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation.

During actual implementation, the second correspondence between the reference coordinate system of the laser processing surface and the coordinate-ranges of the swinging angles of the second galvanometer can be established according to the coordinates of the Q swinging angles of the first galvanometer and the coordinate-ranges of the Q swinging angles of the second galvanometer based on bilinear interpolation. As such, real-time alignment between the measuring light and a keyhole can be realized.

Optionally, establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation may include operations at A51 to A54.

At A51, acquire a coordinate of a reference swinging-angle of the first galvanometer, and the coordinate of the reference swinging-angle of the first galvanometer is a coordinate of any one of the Q swinging angles of the first galvanometer.

At A52, acquire K reference target-points of a calibrating selected-region corresponding to the coordinate of the reference swinging-angle of the first galvanometer, and scan and deflect, by using the second galvanometer, the measuring light to make the measuring light reach the K reference target-points to obtain K detection angles, where K is an integer greater than 1.

At A53, establish a first functional relationship between the coordinate of the reference swinging-angle of the first galvanometer and the K reference target-points.

At A54, establish the second correspondence between the reference coordinate system of the laser processing surface and the coordinate-ranges of the swinging angles of the second galvanometer according to the K detection angles, the first functional relationship, and the coordinate-ranges of the swinging angles of the second galvanometer corresponding to the coordinate of the reference swinging-angle of the first galvanometer based on bilinear interpolation.

According to implementations of the disclosure, during actual implementation, operations above can be used for calibration and alignment between the measuring light and the processing light output by the laser head with the galvanometer.

Specifically, for example, a coordinate of a reference swinging-angle of the first galvanometer is ($\alpha$, $\beta$). The coordinate ($\alpha$, $\beta$) of the reference swinging-angle of the first galvanometer is a coordinate of any one of the Q swinging angles of the first galvanometer. K reference target-points of a calibrating selected-region corresponding to the coordinate ($\alpha$, $\beta$) of the reference swinging-angle of the first galvanometer are acquired, and the measuring light is scanned and deflected, by using the second galvanometer, to make the measuring light reach the K reference target-points to obtain K detection angles, where K is an integer greater than 1. For example, K may be 4. Next, a first functional relationship between the coordinate of the reference swinging-angle of the first galvanometer and the K reference target-points is established. Then, the target points are locked, and the second correspondence between the reference coordinate system of the laser processing surface and the coordinate-ranges of the swinging angles of the second galvanometer is established according to the K detection angles, the first functional relationship, and the coordinate-ranges of the swinging angles of the second galvanometer corresponding to the coordinate of the reference swinging-angle of the first galvanometer based on bilinear interpolation.

In implementations of the disclosure, calibration of a welding surface of a laser head with the galvanometer is the basis for normal operation of galvanometer laser welding. For the calibration of the surface of galvanometer laser welding, in implementations of the disclosure, the welding surface (i.e., laser processing surface) of the processing laser head with the first galvanometer is considered by default to have been calibrated and to be normally operated.

During actual implementation, calibration and alignment of the processing light and the measuring light can be performed, based on bilinear interpolation, in the welding surface (generally, defocusing amount is 0 in an example) where the laser head with the galvanometer can work normally. The process includes operations at 1 to 5.

Figure 4:
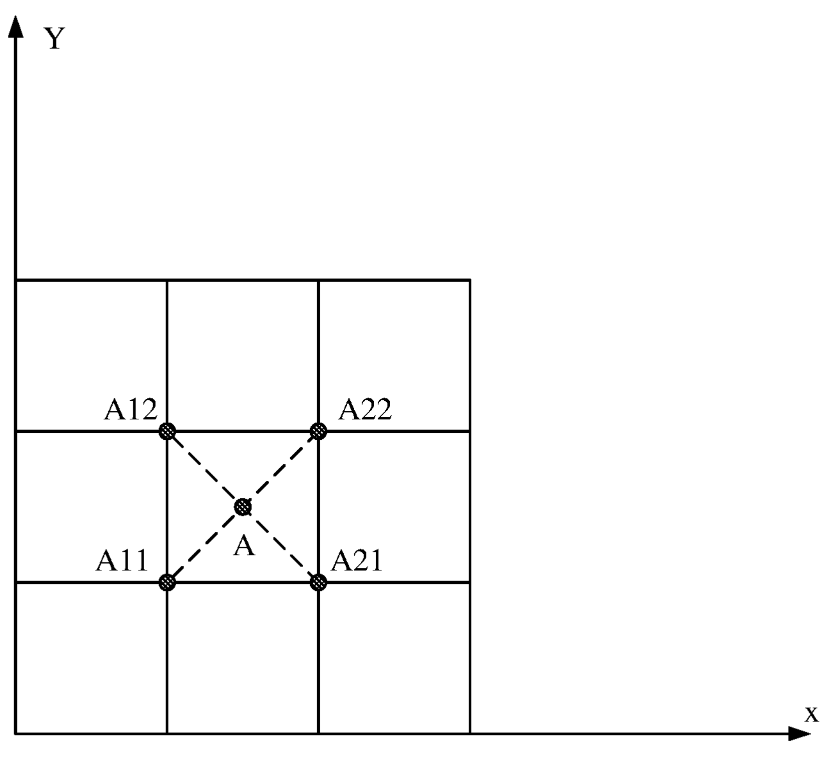
FIG. 4 is a schematic diagram illustrating region division provided in implementations of the disclosure.

1, divide the laser processing surface of the first galvanometer into four quadrants by taking a central point (0, 0) as a coordinate origin, planar scanning directions of the first galvanometer as an x axis and y axis, and divide equally a surface in any one quadrant into 3*3 or 10*10 squares. The number of squares obtained by division can be determined according to actual needs. More squares will lead to higher calibration accuracy. For example, as illustrated in FIG. 4, a surface is divided equally into 3*3 squares to obtain 4*4 dot matrix. Assume a coordinate of A11 is (x1, y1), a coordinate of A12 is (x1, y2), etc., and let x3−x2=x2−x1=x1−0=i, y3−y2=y2−y1=y1−0=j.

2, select one square, such as a square enclosed by A11 (x1, y1), A12 (x1, y2), A21 (x2, y1), and A22 (x2, y2) with a central point A (x1+i/2, y1+j/2), make a mark (a cross or a dot) at the central point by means of the processing laser head with the first galvanometer, and make the first galvanometer stay at this position.

3, scan and deflect, by using the second galvanometer, the measuring light to make the measuring light reach a region near A, determine respectively deflection angles of the second galvanometer when the measuring light reaches A11, A12, A21, and A22, and obtain a deflection angle of the measuring light at A11 as (α1, β1), a deflection angle at A12 as (α2, β2), a deflection angle at A21 as (α3, β3), and a deflection angle at A22 as (α4, β4).

4, obtain a relation between positions in the square region and deflection angles of the second galvanometer based on bilinear interpolation, i.e., $$\alpha = a00 + a01x + a10y + a11xy$$

$$\beta = b00 + b01x + b10y + b11xy$$

Coefficients a00, a01, a10, and all and coefficients b00, b01, b10, and b11 are calculated by the least-squares method, i.e., $$\begin{bmatrix} 1 & x1 & y1 & x1y1 \\ 1 & x1 & y2 & x1y2 \\ 1 & x2 & y1 & x2y1 \\ 1 & x2 & y2 & x2y2 \end{bmatrix} \begin{bmatrix} a00 \\ a01 \\ a10 \\ a11 \end{bmatrix} = \begin{bmatrix} \alpha 1 \\ \alpha 2 \\ \alpha 3 \\ \alpha 4 \end{bmatrix} \begin{bmatrix} 1 & x1 & y1 & x1y1 \\ 1 & x1 & y2 & x1y2 \\ 1 & x2 & y1 & x2y1 \\ 1 & x2 & y2 & x2y2 \end{bmatrix} \begin{bmatrix} b00 \\ b01 \\ b10 \\ b11 \end{bmatrix} = \begin{bmatrix} \beta 1 \\ \beta 2 \\ \beta 3 \\ \beta 4 \end{bmatrix}$$

$$\begin{bmatrix} a00 \\ a01 \\ a10 \\ a11 \end{bmatrix} = \frac{1}{(x2-x1)(y2-y1)} \begin{bmatrix} x2y2 & -x2y1 & -x1y2 & x1y1 \\ -y2 & y1 & y2 & -y1 \\ -x2 & x2 & x1 & -x1 \\ 1 & -1 & -1 & 1 \end{bmatrix} \begin{bmatrix} \alpha 1 \\ \alpha 2 \\ \alpha 3 \\ \alpha 4 \end{bmatrix}$$

$$\begin{bmatrix} b00 \\ b01 \\ b10 \\ b11 \end{bmatrix} = \frac{1}{(x2-x1)(y2-y1)} \begin{bmatrix} x2y2 & -x2y1 & -x1y2 & x1y1 \\ -y2 & y1 & y2 & -y1 \\ -x2 & x2 & x1 & -x1 \\ 1 & -1 & -1 & 1 \end{bmatrix} \begin{bmatrix} \beta 1 \\ \beta 2 \\ \beta 3 \\ \beta 4 \end{bmatrix}$$

5, select in sequence other squares in the surface, repeat operations at 2 to 4, and record corresponding calibration values of deflection angles of the second galvanometer when the laser head with the galvanometer is deflected to a central point of each square.

In implementations of the disclosure, when the laser head with the galvanometer is deflected with a certain deflection angle to make the measuring light reach each square of the welding surface, a current deflection angle of the second galvanometer can be obtained according to a coordinate of the measuring light, such that a specific position of the measuring light after the measuring light passes through the laser head with the galvanometer can be accurately controlled.

Optionally, operations at 302 of performing region division on the laser processing surface in the reference coordinate system to obtain the P calibrating selected-regions of the laser processing surface can be implemented as follows. Divide the laser processing surface into three-dimensional octants by taking a second preset center-point as a coordinate origin, a scanning direction of an X mirror as an x axis, a scanning direction of a Y mirror as a y axis, and a direction perpendicular to the surface as a z axis. Divide equally a surface in any one quadrant in x-y plane into N*N squares and set a height in the z axis to obtain N*N cuboids, where each cuboid corresponds to one calibrating selected-region.

The second preset center-point can be a pre-configured point or a system default point. For example, any point in the laser processing surface can be taken as the second preset center-point.

Specifically, the laser processing surface can be divided into three-dimensional octants by taking the second preset center-point as the coordinate origin, the scanning direction of the X mirror as the x axis, the scanning direction of the Y mirror as the y axis, and the direction perpendicular to the surface as the z axis. A surface in any one quadrant in x-y plane is divided equally into N*N squares, and a height is set in the z axis, to obtain N*N cuboids. Each cuboid corresponds to one calibrating selected-region. In this way, multiple cuboids can be obtained, and calibration can be performed based on each cuboid.

Optionally, operations at 303 of determining the target points in the Q calibrating selected-regions in the P calibrating selected-regions, and determining the coordinate of the swinging angle of the first galvanometer corresponding to said one of the target points in the Q calibrating selected-regions according to the first correspondence may include operations at B31 and B32.

At B31, select the Q calibrating selected-regions in the P calibrating selected-regions.

At B32, select a central point of each of the Q calibrating selected-regions as a target point, and determine the coordinate of the swinging angle of the first galvanometer corresponding to the target point in the Q calibrating selected-regions according to the target point and the first correspondence.

In implementations of the disclosure, the Q calibrating selected-regions are selected from the P calibrating selected-regions, and the Q calibrating selected-regions are any Q calibrating selected-regions in the P calibrating selected-regions. A central point (such as a center of a region) of each of the Q calibrating selected-regions is selected as a target point. Next, the coordinate of the swinging angle of the first galvanometer corresponding to the target point in the Q calibrating selected-regions is determined according to the target point and the first correspondence.

Optionally, operations at 305 of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system can be implemented as follows. Establish the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation.

During actual implementation, the second correspondence between the reference coordinate system of the laser processing surface and the coordinate-ranges of the swinging angles of the second galvanometer can be established according to the coordinates of the Q swinging angles of the first galvanometer and the coordinate-ranges of the Q swinging angles of the second galvanometer based on trilinear interpolation. As such, real-time alignment between the measuring light and the keyhole can be realized.

Optionally, establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation may include operations at B51 to B54.

At B51, acquire a coordinate of a target swinging-angle of the first galvanometer, and the coordinate of the target swinging-angle of the first galvanometer is a coordinate of any one of the Q swinging angles of the first galvanometer.

At B52, acquire W reference target-points of a calibrating selected-region corresponding to the coordinate of the target swinging-angle of the first galvanometer, and scan and deflect, by using the second galvanometer, the measuring light to make the measuring light reach the W reference target-points to obtain W detection angles, where W is an integer greater than 1.

At B53, establish a second functional relationship between the coordinate of the target swinging-angle of the first galvanometer and the W reference target-points.

At B54, establish the second correspondence between the reference coordinate system of the laser processing surface and the coordinate-ranges of the swinging angles of the second galvanometer according to the W detection angles, the second functional relationship, and the coordinate-ranges of the swinging angles of the second galvanometer corresponding to the coordinate of the target swinging-angle of the first galvanometer based on trilinear interpolation.

During actual implementation, for example, a coordinate of a target swinging-angle of the first galvanometer may be $(\alpha, \beta)$. The coordinate $(\alpha, \beta)$ of the target swinging-angle of the first galvanometer is a coordinate of any one of the Q swinging angles of the first galvanometer. Next, W reference target-points of a calibrating selected-region corresponding to the coordinate $(\alpha, \beta)$ of the target swinging-angle of the first galvanometer are acquired, and the measuring light is scanned and deflected, by using the second galvanometer, to make the measuring light reach the W reference target-points to obtain W detection angles, where W is an integer greater than 1. Furthermore, a second functional relationship between the coordinate of the target swinging-angle of the first galvanometer and the W reference target-points is established. Then, the target points are locked, and the second correspondence between the reference coordinate system of the laser processing surface and the coordinate-ranges of the swinging angles of the second galvanometer is established according to the W detection angles, the second functional relationship, and the coordinate-ranges of the swinging angles of the second galvanometer corresponding to the coordinate of the target swinging-angle of the first galvanometer based on trilinear interpolation.

In implementations of the disclosure, if a welding workpiece to-be-tested has a certain height difference or needs to be welded within a certain range of defocusing amount, the calibration can be performed according to trilinear interpolation. Here, a certain height difference can be understood as that a height difference of the welding workpiece is greater than a preset height-difference, and the preset height-difference can be a pre-configured value or a system default value. In addition, a certain range of defocusing amount can be understood as that the defocusing amount is within a preset range, and the preset range can be a pre-configured range or a system default range. The calibration includes the following.

Figure 5:
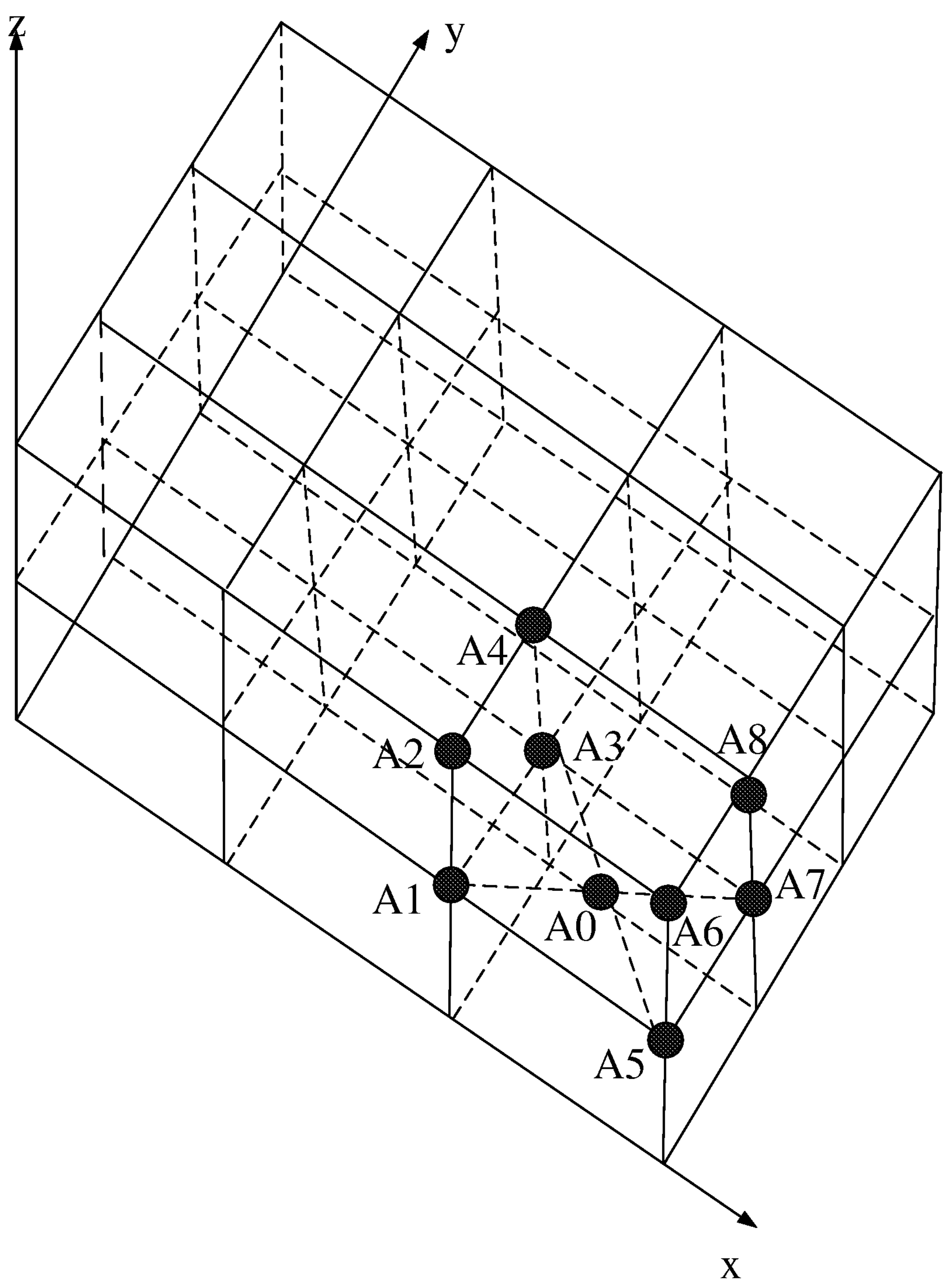
FIG. 5 is a schematic diagram illustrating another region division provided in implementations of the disclosure.

1, divide the laser processing surface of the first galvanometer into three-dimensional octants by taking a central point (0, 0, 0) as a coordinate origin, a scanning direction of an X mirror as an x axis, a scanning direction of a Y mirror as a y axis, and a direction perpendicular to the surface as a z axis, and divide equally a surface in any one quadrant in x-y plane into 3*3 or 10*10 squares. The number of squares obtained by division can be determined according to actual needs. More squares will lead to higher calibration accuracy. Then extend the squares along a direction parallel to the z axis to form cuboids. The processing surface of the laser head with the galvanometer, i.e., x-y plane, is generally greater than 100*100 mm, and a height on z axis is only within ±5 mm. For example, as illustrated in FIG. 5, a surface is divided equally into 3*3 cuboids to obtain 9 cuboids. Assume a coordinate of A1 is (x1, y1, z1), a coordinate of A2 is (x1, y1, z2), a coordinate of A3 is (x1, y2, z1), a coordinate of A4 is (x1, y2, z2), a coordinate of A5 is (x2, y1, z1), a coordinate of A6 is (x2, y1, z2), a coordinate of A7 is (x2, y2, z1), a coordinate of A8 is (x2, y2, z2), etc., and let $x3-x2=x2-x1=x1-0=i$, $y3-y2=y2-y1=y1-0=j$, $z3-z2=z2-z1=z1-0=k$.

2, select one cuboid with a central point of a bottom surface of the cuboid of A0 (x1+i/2, y1+j/2, z1), make a mark (a cross or a dot) at the central point by means of the laser processing head with the first galvanometer, and make the first galvanometer stay at this position.

3, scan and deflect, by using the second galvanometer, the measuring light to make the measuring light reach a region near A0, determine respectively deflection angles of the second galvanometer when the measuring light reaches A1, A3, A5, and A7, and obtain a deflection angle of the second galvanometer when the measuring light reaches A1 as $(\alpha 1, \beta 1)$, a deflection angle when the measuring light reaches A3 as $(\alpha 3, \beta 3)$, a deflection angle when the measuring light reaches A5 as $(\alpha 5, \beta 5)$, a deflection angle when the measuring light reaches A7 as $(\alpha 7, \beta 7)$. Place a workpiece with a height of k on the calibration plane x-y plane, scan and deflect, by using the second galvanometer, the measuring light to make the measuring light reach A2, A4, A6, and A8, and record a deflection angle of the second galvanometer when the measuring light reaches A2 as $(\alpha 2, \beta 2)$, a deflection angle when the measuring light reaches A4 as $(\alpha 4, \beta 4)$, a deflection angle when the measuring light reaches A6 as $(\alpha 6, \beta 6)$, and a deflection angle when the measuring light reaches A8 as $(\alpha 8, \beta 8)$.

4, obtain a relation between positions in the cuboid region and deflection angles of the second galvanometer based on trilinear interpolation, i.e., $$\alpha = a0 + a1x + a2y + a3z + a4xy + a5xz + a6yz + a7xyz$$

$$\beta = b0 + b1x + b2y + b3z + b4xy + b5xz + b6yz + b7xyz$$

Furthermore, substitute coordinate of 8 points, and express in matrix form, i.e., $$\begin{bmatrix} 1 & x1 & y1 & z1 & x1y1 & x1z1 & y1z1 & x1y1z1 \\ 1 & x1 & y1 & z2 & x1y1 & x1z2 & y1z2 & x1y1z2 \\ 1 & x1 & y2 & z1 & x1y2 & x1z1 & y2z1 & x1y2z1 \\ 1 & x1 & y2 & z2 & x1y2 & x1z2 & y2z2 & x1y2z2 \\ 1 & x2 & y1 & z1 & x2y1 & x2z1 & y1z1 & x2y1z1 \\ 1 & x2 & y1 & z2 & x2y1 & x2z2 & y1z2 & x2y1z2 \\ 1 & x2 & y2 & z1 & x2y2 & x2z1 & y2z1 & x2y2z1 \\ 1 & x2 & y2 & z2 & x2y2 & x2z2 & y2z2 & x2y2z2 \end{bmatrix} \begin{bmatrix} a0 \\ a1 \\ a2 \\ a3 \\ a4 \\ a5 \\ a6 \\ a7 \end{bmatrix} = \begin{bmatrix} \alpha 0 \\ \alpha 1 \\ \alpha 2 \\ \alpha 3 \\ \alpha 4 \\ \alpha 5 \\ \alpha 6 \\ \alpha 7 \end{bmatrix}$$

-continued $$\begin{bmatrix} 1 & x1 & y1 & z1 & x1y1 & x1z1 & y1z1 & x1y1z1 \\ 1 & x1 & y1 & z2 & x1y1 & x1z2 & y1z2 & x1y1z2 \\ 1 & x1 & y2 & z1 & x1y2 & x1z1 & y2z1 & x1y2z1 \\ 1 & x1 & y2 & z2 & x1y2 & x1z2 & y2z2 & x1y2z2 \\ 1 & x2 & y1 & z1 & x2y1 & x2z1 & y1z1 & x2y1z1 \\ 1 & x2 & y1 & z2 & x2y1 & x2z2 & y1z2 & x2y1z2 \\ 1 & x2 & y2 & z1 & x2y2 & x2z1 & y2z1 & x2y2z1 \\ 1 & x2 & y2 & z2 & x2y2 & x2z2 & y2z2 & x2y2z2 \end{bmatrix} \begin{bmatrix} b0 \\ b1 \\ b2 \\ b3 \\ b4 \\ b5 \\ b6 \\ b7 \end{bmatrix} = \begin{bmatrix} \beta0 \\ \beta1 \\ \beta2 \\ \beta3 \\ \beta4 \\ \beta5 \\ \beta6 \\ \beta7 \end{bmatrix}$$

5, select in sequence other cuboids in the welding region, repeat operations at 2 to 4, record corresponding calibration values of deflection angles of the second galvanometer when the laser head with the galvanometer is deflected to make the measuring light reach a central point of a bottom surface of each cuboid.

In implementations of the disclosure, when the laser head with the galvanometer is deflected to make the measuring light reach each cuboid of the welding surface where the laser head has a certain deflection angle, a current deflection angle of the second galvanometer can be obtained according to a coordinate of the measuring light, such that a specific position of the measuring light after the measuring light passes through the laser head with the galvanometer can be accurately controlled.

It can be seen that, the method for adjusting swinging of a galvanometer illustrated in implementations of the disclosure is applied to the device for adjusting swinging of a galvanometer. The device for adjusting swinging of a galvanometer includes the first galvanometer and the second galvanometer. The first galvanometer is configured to adjust the pointing direction of the processing laser entering from the laser processing head, and the second galvanometer is configured to adjust the pointing direction of the measuring light entering from the optical sensor. The method for adjusting swinging of a galvanometer includes the following operations. Guide the processing laser to the laser processing surface via the first galvanometer, and establishing the first correspondence between the reference coordinate system of the laser processing surface and the coordinate-ranges of the swinging angles of the first galvanometer. Perform region division on the laser processing surface in the reference coordinate system to obtain the P calibrating selected-regions of the laser processing surface, where P is an integer greater than 1. Determine the target points in Q calibrating selected-regions in the P calibrating selected-regions, and determining the coordinate of the swinging angle of the first galvanometer corresponding to said one of the target points in the Q calibrating selected-regions according to the first correspondence, to obtain the coordinates of the Q swinging angles of the first galvanometer, where Q is an integer greater than 1 and less than or equal to P. Guide the measuring light to the laser processing surface via the second galvanometer and the first galvanometer adjusted according to the Q swinging angles of the first galvanometer, and determining the coordinate-ranges of the Q swinging angles of the second galvanometer. Establish stablishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system. That is, in an application scenario with two galvanometers, region division can be performed on the laser processing surface when there is a second galvanometer configured for calibration, and thus the first galvanometer can be calibrated in different regions, and then the correspondence between the reference coordinate system of the whole laser processing surface and the coordinate-ranges of the swinging angles of the second galvanometer can be established. As such, real-time alignment between the measuring light and a keyhole can be realized.

Figure 6:
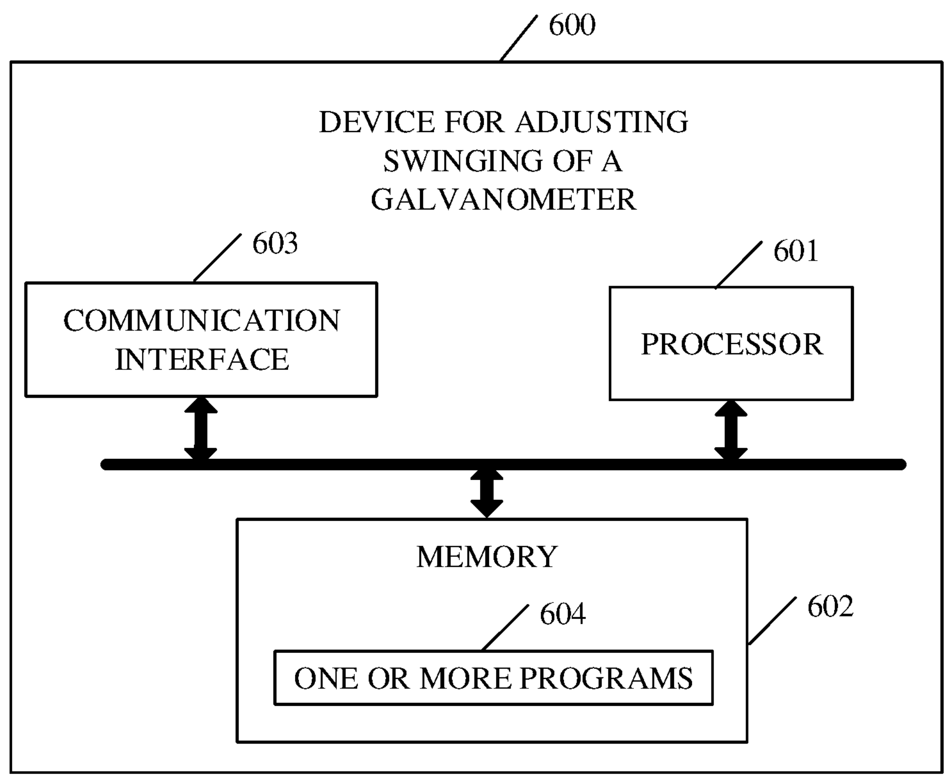
FIG. 6 is a schematic structural diagram of another device for adjusting swinging of a galvanometer provided in implementations of the disclosure.

In consistence with the foregoing implementations, refer to FIG. 6, FIG. 6 is a schematic structural diagram of another device 600 for adjusting swinging of a galvanometer provided in implementations of the disclosure. As illustrated in FIG. 6, the device 600 for adjusting swinging of a galvanometer includes a processor 601, a memory 602, a communication interface 603, and one or more programs 604. The device 600 for adjusting swinging of a galvanometer may further include a first galvanometer and a second galvanometer. The first galvanometer is configured to adjust a pointing direction of processing laser entering from a laser processing head, and the second galvanometer is configured to adjust a pointing direction of measuring light entering from an optical sensor. The one or more programs 604 are stored in the memory 602 and configured to be executed by the processor 601. In implementations of the disclosure, the programs include instructions for performing the following operations.

Guide the processing laser to a laser processing surface via the first galvanometer, and establish a first correspondence between a reference coordinate system of the laser processing surface and coordinate-ranges of swinging angles of the first galvanometer. Perform region division on the laser processing surface in the reference coordinate system to obtain P calibrating selected-regions of the laser processing surface, where P is an integer greater than 1. Determine target points in Q calibrating selected-regions in the P calibrating selected-regions, and determine a coordinate of a swinging angle of the first galvanometer corresponding to one of the target points in the Q calibrating selected-regions according to the first correspondence, to obtain coordinates of Q swinging angles of the first galvanometer, where Q is an integer greater than 1 and less than or equal to P. Guide the measuring light to the laser processing surface via the second galvanometer and the first galvanometer adjusted according to the Q swinging angles of the first galvanometer, and determine coordinate-ranges of Q swinging angles of the second galvanometer. Establish a second correspondence between the reference coordinate system of the laser processing surface and coordinate-ranges of swinging angles of the second galvanometer according to the coordinates of the Q swinging angles of the first galvanometer and the coordinate-ranges of the Q swinging angles of the second galvanometer, to determine a swinging coordinate-range of the second galvanometer in the reference coordinate system.

Optionally, in terms of performing region division on the laser processing surface in the reference coordinate system to obtain the P calibrating selected-regions of the laser processing surface, the programs include instructions for performing the following operations. Divide the laser processing surface into four quadrants by taking a first preset center-point as a coordinate origin, a scanning direction of an X mirror as an x axis, and a scanning direction of a Y mirror as a y axis, and divide equally a surface in any one quadrant into M*M squares, where each square corresponds to one calibrating selected-region, and M is an integer greater than 1.

Optionally, in terms of determining the target points in the Q calibrating selected-regions in the P calibrating selected-regions, and determining the coordinate of the swinging angle of the first galvanometer corresponding to said one of the target points in the Q calibrating selected-regions according to the first correspondence, the programs include instructions for performing the following operations. Select the Q calibrating selected-regions in the P calibrating selected-regions; and select a target point in each of the Q calibrating selected-regions, and determine the coordinate of the swinging angle of the first galvanometer corresponding to the target point in the Q calibrating selected-regions according to the target point and the first correspondence.

Optionally, in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system, the programs include instructions for performing the following operations. Establish the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation.

Optionally, in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation, the programs include instructions for performing the following operations. Acquire a coordinate of a reference swinging-angle of the first galvanometer, and the coordinate of the reference swinging-angle of the first galvanometer is a coordinate of any one of the Q swinging angles of the first galvanometer. Acquire K reference target-points of a calibrating selected-region corresponding to the coordinate of the reference swinging-angle of the first galvanometer, and scan and deflect, by using the second galvanometer, the measuring light to make the measuring light reach the K reference target-points to obtain K detection angles, where K is an integer greater than 1. Establish a first functional relationship between the coordinate of the reference swinging-angle of the first galvanometer and the K reference target-points. Establish the second correspondence between the reference coordinate system of the laser processing surface and the coordinate-ranges of the swinging angles of the second galvanometer according to the K detection angles, the first functional relationship, and the coordinate-ranges of the swinging angles of the second galvanometer corresponding to the coordinate of the reference swinging-angle of the first galvanometer based on bilinear interpolation.

Optionally, in terms of performing region division on the laser processing surface in the reference coordinate system to obtain the P calibrating selected-regions of the laser processing surface, the programs include instructions for performing the following operations. Divide the laser processing surface into three-dimensional octants by taking a second preset center-point as a coordinate origin, a scanning direction of an X mirror as an x axis, a scanning direction of a Y mirror as a y axis, and a direction perpendicular to the surface as a z axis, and divide equally a surface in any one quadrant in x-y plane into N*N squares and set a height in the z axis to obtain N*N cuboids, where each cuboid corresponds to one calibrating selected-region.

Optionally, in terms of determining the target points in the Q calibrating selected-regions in the P calibrating selected-regions, and determining the coordinate of the swinging angle of the first galvanometer corresponding to said one of the target points in the Q calibrating selected-regions according to the first correspondence, the programs include instructions for performing the following operations. Select the Q calibrating selected-regions in the P calibrating selected-regions; and select a central point of each of the Q calibrating selected-regions as a target point, and determine the coordinate of the swinging angle of the first galvanometer corresponding to the target point in the Q calibrating selected-regions according to the target point and the first correspondence.

Optionally, in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system, the programs include instructions for performing the following operations. Establish the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation.

Optionally, in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation, the programs include instructions for performing the following operations. Acquire a coordinate of a target swinging-angle of the first galvanometer, and the coordinate of the target swinging-angle of the first galvanometer being a coordinate of any one of the Q swinging angles of the first galvanometer. Acquire W reference target-points of a calibrating selected-region corresponding to the coordinate of the target swinging-angle of the first galvanometer, and scan and deflect, by using the second galvanometer, the measuring light to make the measuring light reach the W reference target-points to obtain W detection angles, where W is an integer greater than 1. Establish a second functional relationship between the coordinate of the target swinging-angle of the first galvanometer and the W reference target-points. Establish the second correspondence between the reference coordinate system of the laser processing surface and the coordinate-ranges of the swinging angles of the second galvanometer according to the W detection angles, the second functional relationship, and the coordinate-ranges of the swinging angles of the second galvanometer corresponding to the coordinate of the target swinging-angle of the first galvanometer based on trilinear interpolation.

It can be seen that, for the device for adjusting swinging of a galvanometer illustrated in implementations of the disclosure, the device for adjusting swinging of a galvanometer includes the first galvanometer and the second galvanometer. The first galvanometer is configured to adjust the pointing direction of the processing laser entering from the laser processing head, and the second galvanometer is configured to adjust the pointing direction of the measuring light entering from the optical sensor. The method for adjusting swinging of a galvanometer includes the following operations. Guide the processing laser to the laser processing surface via the first galvanometer, and establishing the first correspondence between the reference coordinate system of the laser processing surface and the coordinate-ranges of the swinging angles of the first galvanometer. Perform region division on the laser processing surface in the reference coordinate system to obtain the P calibrating selected-regions of the laser processing surface, where P is an integer greater than 1. Determine the target points in Q calibrating selected-regions in the P calibrating selected-regions, and determining the coordinate of the swinging angle of the first galvanometer corresponding to said one of the target points in the Q calibrating selected-regions according to the first correspondence, to obtain the coordinates of the Q swinging angles of the first galvanometer, where Q is an integer greater than 1 and less than or equal to P. Guide the measuring light to the laser processing surface via the second galvanometer and the first galvanometer adjusted according to the Q swinging angles of the first galvanometer, and determining the coordinate-ranges of the Q swinging angles of the second galvanometer. Establish stablishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system. That is, in an application scenario with two galvanometers, region division can be performed on the laser processing surface when there is a second galvanometer configured for calibration, and thus the first galvanometer can be calibrated in different regions, and then the correspondence between the reference coordinate system of the whole laser processing surface and the coordinate-ranges of the swinging angles of the second galvanometer can be established. As such, real-time alignment between the measuring light and a keyhole can be realized.

Figure 7:
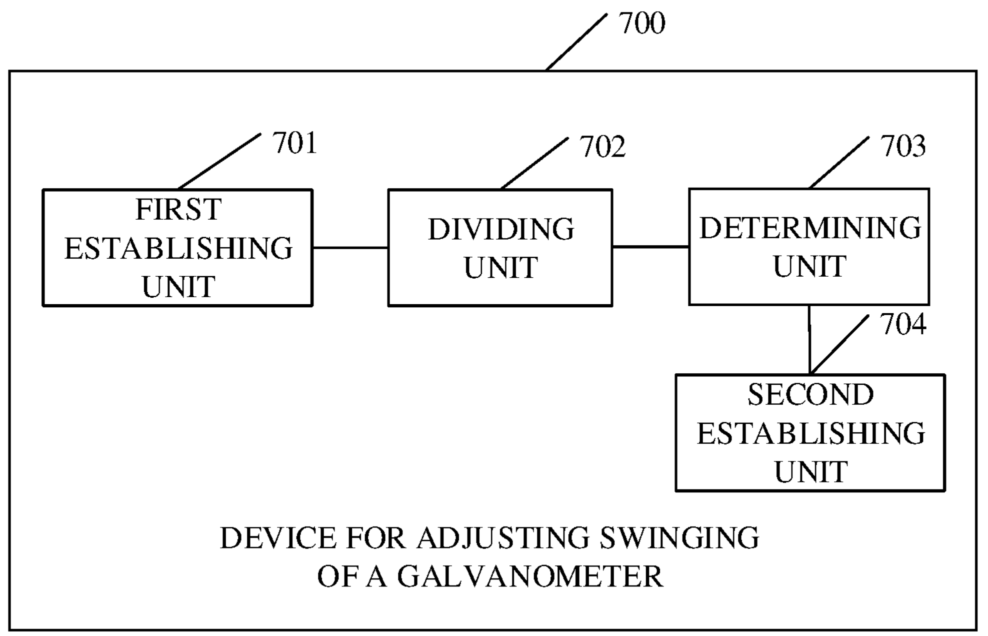
FIG. 7 is a composition block diagram of functional units of a device for adjusting swinging of a galvanometer provided in implementations of the disclosure.

FIG. 7 is a composition block diagram of functional units of a device 700 for adjusting swinging of a galvanometer provided in implementations of the disclosure. The device 700 for adjusting swinging of a galvanometer may include a first galvanometer and a second galvanometer. The first galvanometer is configured to adjust a pointing direction of processing laser entering from a laser processing head, and the second galvanometer is configured to adjust a pointing direction of measuring light entering from an optical sensor. The device 700 includes a first establishing unit 701, a dividing unit 702, a determining unit 703, and a second establishing unit 704. The first establishing unit 701 is configured to guide the processing laser to a laser processing surface via the first galvanometer, and establish a first correspondence between a reference coordinate system of the laser processing surface and coordinate-ranges of swinging angles of the first galvanometer. The dividing unit 702 is configured to perform region division on the laser processing surface in the reference coordinate system to obtain P calibrating selected-regions of the laser processing surface, where P is an integer greater than 1. The determining unit 703 is configured to determine target points in Q calibrating selected-regions in the P calibrating selected-regions, and determine a coordinate of a swinging angle of the first galvanometer corresponding to one of the target points in the Q calibrating selected-regions according to the first correspondence, to obtain coordinates of Q swinging angles of the first galvanometer, where Q is an integer greater than 1 and less than or equal to P; and guide the measuring light to the laser processing surface via the second galvanometer and the first galvanometer adjusted according to the Q swinging angles of the first galvanometer, and determine coordinate-ranges of Q swinging angles of the second galvanometer. The second establishing unit 704 is configured to establish a second correspondence between the reference coordinate system of the laser processing surface and coordinate-ranges of swinging angles of the second galvanometer according to the coordinates of the Q swinging angles of the first galvanometer and the coordinate-ranges of the Q swinging angles of the second galvanometer, to determine a swinging coordinate-range of the second galvanometer in the reference coordinate system.

Optionally, in terms of performing region division on the laser processing surface in the reference coordinate system to obtain the P calibrating selected-regions of the laser processing surface, the dividing unit 702 is specifically configured to perform the following operations. Divide the laser processing surface into four quadrants by taking a first preset center-point as a coordinate origin, a scanning direction of an X mirror as an x axis, and a scanning direction of a Y mirror as a y axis, and divide equally a surface in any one quadrant into M*M squares, where each square corresponds to one calibrating selected-region, and M is an integer greater than 1.

Optionally, in terms of determining the target points in the Q calibrating selected-regions in the P calibrating selected-regions, and determining the coordinate of the swinging angle of the first galvanometer corresponding to said one of the target points in the Q calibrating selected-regions according to the first correspondence, the determining unit 703 is specifically configured to perform the following operations. Select the Q calibrating selected-regions in the P calibrating selected-regions; and select a target point in each of the Q calibrating selected-regions, and determine the coordinate of the swinging angle of the first galvanometer corresponding to the target point in the Q calibrating selected-regions according to the target point and the first correspondence.

Optionally, in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system, the second establishing unit 704 is specifically configured to perform the following operations. Establish the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation.

Optionally, in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation, the second establishing unit 704 is specifically configured to perform the following operations. Acquire a coordinate of a reference swinging-angle of the first galvanometer, the coordinate of the reference swinging-angle of the first galvanometer being a coordinate of any one of the Q swinging angles of the first galvanometer. Acquire K reference target-points of a calibrating selected-region corresponding to the coordinate of the reference swinging-angle of the first galvanometer, and scan and deflect, by using the second galvanometer, the measuring light to make the measuring light reach the K reference target-points to obtain K detection angles, where K is an integer greater than 1 Establish a first functional relationship between the coordinate of the reference swinging-angle of the first galvanometer and the K reference target-points. Establish the second correspondence between the reference coordinate system of the laser processing surface and the coordinate-ranges of the swinging angles of the second galvanometer according to the K detection angles, the first functional relationship, and the coordinate-ranges of the swinging angles of the second galvanometer corresponding to the coordinate of the reference swinging-angle of the first galvanometer based on bilinear interpolation.

Optionally, in terms of performing region division on the laser processing surface in the reference coordinate system to obtain the P calibrating selected-regions of the laser processing surface, the dividing unit 702 is specifically configured to perform the following operations. Divide the laser processing surface into three-dimensional octants by taking a second preset center-point as a coordinate origin, a scanning direction of an X mirror as an x axis, a scanning direction of a Y mirror as a y axis, and a direction perpendicular to the surface as a z axis, and divide equally a surface in any one quadrant in x-y plane into N*N squares and set a height in the z axis to obtain N*N cuboids, where each cuboid corresponds to one calibrating selected-region.

Optionally, in terms of determining the target points in the Q calibrating selected-regions in the P calibrating selected-regions, and determining the coordinate of the swinging angle of the first galvanometer corresponding to said one of the target points in the Q calibrating selected-regions according to the first correspondence, the determining unit 703 is specifically configured to perform the following operations. Select the Q calibrating selected-regions in the P calibrating selected-regions. Select a central point of each of the Q calibrating selected-regions as a target point, and determine the coordinate of the swinging angle of the first galvanometer corresponding to the target point in the Q calibrating selected-regions according to the target point and the first correspondence.

Optionally, in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system, the second establishing unit 704 is specifically configured to perform the following operations. Establish the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation.

Optionally, in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation, the second establishing unit 704 is specifically configured to perform the following operations. Acquire a coordinate of a target swinging-angle of the first galvanometer, the coordinate of the target swinging-angle of the first galvanometer being a coordinate of any one of the Q swinging angles of the first galvanometer. Acquire W reference target-points of a calibrating selected-region corresponding to the coordinate of the target swinging-angle of the first galvanometer, and scan and deflect, by using the second galvanometer, the measuring light to make the measuring light reach the W reference target-points to obtain W detection angles, where W is an integer greater than 1 Establish a second functional relationship between the coordinate of the target swinging-angle of the first galvanometer and the W reference target-points. Establish the second correspondence between the reference coordinate system of the laser processing surface and the coordinate-ranges of the swinging angles of the second galvanometer according to the W detection angles, the second functional relationship, and the coordinate-ranges of the swinging angles of the second galvanometer corresponding to the coordinate of the target swinging-angle of the first galvanometer based on trilinear interpolation.

It can be seen that, the device for adjusting swinging of a galvanometer illustrated in implementations of the disclosure includes the first galvanometer and the second galvanometer. The first galvanometer is configured to adjust the pointing direction of the processing laser entering from the laser processing head, and the second galvanometer is configured to adjust the pointing direction of the measuring light entering from the optical sensor. The method for adjusting swinging of a galvanometer includes the following operations. Guide the processing laser to the laser processing surface via the first galvanometer, and establishing the first correspondence between the reference coordinate system of the laser processing surface and the coordinate-ranges of the swinging angles of the first galvanometer. Perform region division on the laser processing surface in the reference coordinate system to obtain the P calibrating selected-regions of the laser processing surface, where P is an integer greater than 1. Determine the target points in Q calibrating selected-regions in the P calibrating selected-regions, and determining the coordinate of the swinging angle of the first galvanometer corresponding to said one of the target points in the Q calibrating selected-regions according to the first correspondence, to obtain the coordinates of the Q swinging angles of the first galvanometer, where Q is an integer greater than 1 and less than or equal to P. Guide the measuring light to the laser processing surface via the second galvanometer and the first galvanometer adjusted according to the Q swinging angles of the first galvanometer, and determining the coordinate-ranges of the Q swinging angles of the second galvanometer. Establish the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system. That is, in an application scenario with two galvanometers, region division can be performed on the laser processing surface when there is a second galvanometer configured for calibration, and thus the first galvanometer can be calibrated in different regions, and then the correspondence between the reference coordinate system of the whole laser processing surface and the coordinate-ranges of the swinging angles of the second galvanometer can be established. As such, real-time alignment between the measuring light and a keyhole can be realized.

It can be understood that, functions of program modules of the device for adjusting swinging of a galvanometer in the implementations can be implemented according to the methods in the above method implementations, and the specific implementation process can refer to the relevant illustration of the above method implementations, which is not repeated here.

A non-transitory computer storage medium is further provided in implementations of the disclosure. The non-transitory computer storage medium is configured to store a computer program used for performing electronic data interchange. The computer program enables a computer to execute part or all of operations of any method described in the method implementations mentioned above. The computer includes a device for adjusting swinging of a galvanometer.

A computer program product is further provided in implementations of the disclosure. The computer program product includes a non-transitory computer-readable storage medium that stores computer programs. The computer programs are operable to enable a computer to execute part or all of operations of any method described in the method implementations mentioned above. The computer program product may be a software installation package. The computer includes a device for adjusting swinging of a galvanometer.

It needs to be noted that, for the sake of simplicity, each of the foregoing method implementations is described as a series of action combinations. However, it will be appreciated by those skilled in the art that the disclosure is not limited by the sequence of actions described. According to the disclosure, some operations may be performed in other orders or be performed simultaneously. Besides, it will be appreciated by those skilled in the art that the implementations described in the specification are exemplary implementations, and the actions and modules involved are not necessarily essential to the disclosure.

In the foregoing implementations, the illustration of each implementation has its own emphasis. For the parts not described in detail in one implementation, reference may be made to related illustration in other implementations.

It will be appreciated that the devices disclosed in implementations herein may also be implemented in other manners. For example, the above device implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be realized through some interface, and an indirect coupling or communication connection between devices or units may be electrical or otherwise.

The units illustrated as separated components may or may not be physically separated. Components illustrated as units may or may not be physical units, i.e., may reside at one location or may be distributed to multiple network units. Some or all of the units may be selectively adopted according to practical needs to achieve desired objectives of the disclosure.

Various functional units described in implementations herein may be integrated into one processing unit or may be presented as a number of physically separated units, and two or more units may be integrated into one unit. The integrated unit may take the form of hardware or a software functional unit.

If the integrated units are implemented as software functional units and sold or used as independent products, they may be stored in a computer-readable storage medium. Based on such an understanding, the essential technical solution, or the portion that contributes to the related art, or all or part of the technical solution of the disclosure may be embodied as software products. The computer software products can be stored in a storage medium and may include multiple instructions that, when executed, can cause a computing device, e.g., a personal computer, a server, or a network device, etc., to execute some or all operations in the methods described in various implementations. The above storage medium may include various kinds of media that can store program codes, such as a universal serial bus (USB), a read-only memory (ROM), a random access memory (RAM), a mobile hard drive, a magnetic disk, or an optical disk.

It will be understood by those of ordinary skill in the art that all or part of the various methods of the implementations described above may be accomplished by means of a program to instruct associated hardware, and the program may be stored in a computer-readable memory, which may include a flash disk, an ROM, an RAM, a magnetic disk, or an optical disk.

The above implementations in the disclosure are described in detail. Principles and implementation manners of the disclosure are elaborated with specific implementations herein. The illustration of implementations above is only used to help understanding of methods and core ideas of the present disclosure. At the same time, for those of ordinary skill in the art, according to ideas of the present disclosure, there will be changes in the specific implementations and application scope. In summary, contents of this specification should not be understood as limitation on the present disclosure.

What is claimed is:

1. A method for adjusting swinging of a galvanometer, wherein the method for adjusting swinging of a galvanometer is applied to a device for adjusting swinging of a galvanometer, the device for adjusting swinging of a galvanometer comprises a first galvanometer and a second galvanometer, the first galvanometer is configured to adjust a pointing direction of processing laser entering from a laser processing head, the second galvanometer is configured to adjust a pointing direction of measuring light entering from an optical sensor, and the method comprises:

guiding the processing laser to a laser processing surface via the first galvanometer, and establishing a first correspondence between a reference coordinate system of the laser processing surface and coordinate-ranges of swinging angles of the first galvanometer;

performing region division on the laser processing surface in the reference coordinate system to obtain P calibrating selected-regions of the laser processing surface, wherein P is an integer greater than 1;

determining target points in Q calibrating selected-regions in the P calibrating selected-regions, and determining a coordinate of a swinging angle of the first galvanometer corresponding to one of the target points in the Q calibrating selected-regions according to the first correspondence, to obtain coordinates of Q swinging angles of the first galvanometer, wherein Q is an integer greater than 1 and less than or equal to P;

guiding the measuring light to the laser processing surface via the second galvanometer and the first galvanometer adjusted according to the Q swinging angles of the first galvanometer, and determining coordinate-ranges of Q swinging angles of the second galvanometer; and establishing a second correspondence between the reference coordinate system of the laser processing surface and coordinate-ranges of swinging angles of the second galvanometer according to the coordinates of the Q swinging angles of the first galvanometer and the coordinate-ranges of the Q swinging angles of the second galvanometer, to determine a swinging coordinate-range of the second galvanometer in the reference coordinate system.

2. The method for adjusting swinging of a galvanometer of claim 1, wherein performing region division on the laser processing surface in the reference coordinate system to obtain the P calibrating selected-regions of the laser processing surface comprises:

dividing the laser processing surface into four quadrants by taking a first preset center-point as a coordinate origin, a scanning direction of an X mirror as an x axis, and a scanning direction of a Y mirror as a y axis, and dividing equally a surface in any one quadrant into M*M squares, wherein each square corresponds to one calibrating selected-region, and M is an integer greater than 1.

3. The method for adjusting swinging of a galvanometer of claim 2, wherein determining the target points in the Q calibrating selected-regions in the P calibrating selected-regions, and determining the coordinate of the swinging angle of the first galvanometer corresponding to said one of the target points in the Q calibrating selected-regions according to the first correspondence comprises:

selecting the Q calibrating selected-regions in the P calibrating selected-regions; and selecting a target point in each of the Q calibrating selected-regions, and determining the coordinate of the swinging angle of the first galvanometer corresponding to the target point in the Q calibrating selected-regions according to the target point and the first correspondence.

4. The method for adjusting swinging of a galvanometer of claim 3, wherein establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system comprises:

establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation.

5. The method for adjusting swinging of a galvanometer of claim 4, wherein establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation comprising:

acquiring a coordinate of a reference swinging-angle of the first galvanometer, the coordinate of the reference swinging-angle of the first galvanometer being a coordinate of any one of the Q swinging angles of the first galvanometer;

acquiring K reference target-points of a calibrating selected-region corresponding to the coordinate of the reference swinging-angle of the first galvanometer, and scanning and deflecting, by using the second galvanometer, the measuring light to make the measuring light reach the K reference target-points to obtain K detection angles, wherein K is an integer greater than 1;

establishing a first functional relationship between the coordinate of the reference swinging-angle of the first galvanometer and the K reference target-points; and establishing the second correspondence between the reference coordinate system of the laser processing surface and the coordinate-ranges of the swinging angles of the second galvanometer according to the K detection angles, the first functional relationship, and the coordinate-ranges of the swinging angles of the second galvanometer corresponding to the coordinate of the reference swinging-angle of the first galvanometer based on bilinear interpolation.

6. The method for adjusting swinging of a galvanometer of claim 1, wherein performing region division on the laser processing surface in the reference coordinate system to obtain the P calibrating selected-regions of the laser processing surface comprises:

dividing the laser processing surface into three-dimensional octants by taking a second preset center-point as a coordinate origin, a scanning direction of an X mirror as an x axis, a scanning direction of a Y mirror as a y axis, and a direction perpendicular to the surface as a z axis, and dividing equally a surface in any one quadrant in x-y plane into N*N squares and setting a height in the z axis to obtain N*N cuboids, wherein each cuboid corresponds to one calibrating selected-region.

7. The method for adjusting swinging of a galvanometer of claim 6, wherein determining the target points in the Q calibrating selected-regions in the P calibrating selected-regions, and determining the coordinate of the swinging angle of the first galvanometer corresponding to said one of the target points in the Q calibrating selected-regions according to the first correspondence comprises:

selecting the Q calibrating selected-regions in the P calibrating selected-regions; and selecting a central point of each of the Q calibrating selected-regions as a target point, and determining the coordinate of the swinging angle of the first galvanometer corresponding to the target point in the Q calibrating selected-regions according to the target point and the first correspondence.

8. The method for adjusting swinging of a galvanometer of claim 7, wherein establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system comprises:

establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation.

9. The method for adjusting swinging of a galvanometer of claim 8, wherein establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation comprises:

acquiring a coordinate of a target swinging-angle of the first galvanometer, the coordinate of the target swinging-angle of the first galvanometer being a coordinate of any one of the Q swinging angles of the first galvanometer;

acquiring W reference target-points of a calibrating selected-region corresponding to the coordinate of the target swinging-angle of the first galvanometer, and scanning and deflecting, by using the second galvanometer, the measuring light to make the measuring light reach the W reference target-points to obtain W detection angles, wherein W is an integer greater than 1;

establishing a second functional relationship between the coordinate of the target swinging-angle of the first galvanometer and the W reference target-points; and establishing the second correspondence between the reference coordinate system of the laser processing surface and the coordinate-ranges of the swinging angles of the second galvanometer according to the W detection angles, the second functional relationship, and the coordinate-ranges of the swinging angles of the second galvanometer corresponding to the coordinate of the target swinging-angle of the first galvanometer based on trilinear interpolation.

10. A device for adjusting swinging of a galvanometer, the device for adjusting swinging of a galvanometer comprising a first galvanometer, a second galvanometer, a processor, and a memory, wherein the first galvanometer is configured to adjust a pointing direction of processing laser entering from a laser processing head, the second galvanometer is configured to adjust a pointing direction of measuring light entering from an optical sensor, the memory is configured to store one or more programs, and the one or more programs are configured to be executed by the processor and include instructions used for performing:

guiding the processing laser to a laser processing surface via the first galvanometer, and establishing a first correspondence between a reference coordinate system of the laser processing surface and coordinate-ranges of swinging angles of the first galvanometer;

performing region division on the laser processing surface in the reference coordinate system to obtain P calibrating selected-regions of the laser processing surface, wherein P is an integer greater than 1;

determining target points in Q calibrating selected-regions in the P calibrating selected-regions, and determining a coordinate of a swinging angle of the first galvanometer corresponding to one of the target points in the Q calibrating selected-regions according to the first correspondence, to obtain coordinates of Q swinging angles of the first galvanometer, wherein Q is an integer greater than 1 and less than or equal to P;

guiding the measuring light to the laser processing surface via the second galvanometer and the first galvanometer adjusted according to the Q swinging angles of the first galvanometer, and determining coordinate-ranges of Q swinging angles of the second galvanometer; and establishing a second correspondence between the reference coordinate system of the laser processing surface and coordinate-ranges of swinging angles of the second galvanometer according to the coordinates of the Q swinging angles of the first galvanometer and the coordinate-ranges of the Q swinging angles of the second galvanometer, to determine a swinging coordinate-range of the second galvanometer in the reference coordinate system.

11. The device for adjusting swinging of a galvanometer of claim 10, wherein in terms of performing region division on the laser processing surface in the reference coordinate system to obtain the P calibrating selected-regions of the laser processing surface, the one or more programs include instructions used for performing:

dividing the laser processing surface into four quadrants by taking a first preset center-point as a coordinate origin, a scanning direction of an X mirror as an x axis, and a scanning direction of a Y mirror as a y axis, and dividing equally a surface in any one quadrant into M*M squares, wherein each square corresponds to one calibrating selected-region, and M is an integer greater than 1.

12. The device for adjusting swinging of a galvanometer of claim 11, wherein in terms of determining the target points in the Q calibrating selected-regions in the P calibrating selected-regions, and determining the coordinate of the swinging angle of the first galvanometer corresponding to said one of the target points in the Q calibrating selected-regions according to the first correspondence, the one or more programs include instructions used for performing:

selecting the Q calibrating selected-regions in the P calibrating selected-regions; and selecting a target point in each of the Q calibrating selected-regions, and determining the coordinate of the swinging angle of the first galvanometer corresponding to the target point in the Q calibrating selected-regions according to the target point and the first correspondence.

13. The device for adjusting swinging of a galvanometer of claim 12, wherein in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system, the one or more programs include instructions used for performing:

establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation.

14. The device for adjusting swinging of a galvanometer of claim 13, wherein in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on bilinear interpolation, the one or more programs include instructions used for performing:

acquiring a coordinate of a reference swinging-angle of the first galvanometer, the coordinate of the reference swinging-angle of the first galvanometer being a coordinate of any one of the Q swinging angles of the first galvanometer;

acquiring K reference target-points of a calibrating selected-region corresponding to the coordinate of the reference swinging-angle of the first galvanometer, and scanning and deflecting, by using the second galvanometer, the measuring light to make the measuring light reach the K reference target-points to obtain K detection angles, wherein K is an integer greater than 1;

establishing a first functional relationship between the coordinate of the reference swinging-angle of the first galvanometer and the K reference target-points; and establishing the second correspondence between the reference coordinate system of the laser processing surface and the coordinate-ranges of the swinging angles of the second galvanometer according to the K detection angles, the first functional relationship, and the coordinate-ranges of the swinging angles of the second galvanometer corresponding to the coordinate of the reference swinging-angle of the first galvanometer based on bilinear interpolation.

15. The device for adjusting swinging of a galvanometer of claim 10, wherein in terms of performing region division on the laser processing surface in the reference coordinate system to obtain the P calibrating selected-regions of the laser processing surface, the one or more programs include instructions used for performing:

dividing the laser processing surface into three-dimensional octants by taking a second preset center-point as a coordinate origin, a scanning direction of an X mirror as an x axis, a scanning direction of a Y mirror as a y axis, and a direction perpendicular to the surface as a z axis, and dividing equally a surface in any one quadrant in x-y plane into N*N squares and setting a height in the z axis to obtain N*N cuboids, wherein each cuboid corresponds to one calibrating selected-region.

16. The device for adjusting swinging of a galvanometer of claim 15, wherein in terms of determining the target points in the Q calibrating selected-regions in the P calibrating selected-regions, and determining the coordinate of the swinging angle of the first galvanometer corresponding to said one of the target points in the Q calibrating selected-regions according to the first correspondence, the one or more programs include instructions used for performing:

selecting the Q calibrating selected-regions in the P calibrating selected-regions; and selecting a central point of each of the Q calibrating selected-regions as a target point, and determining the coordinate of the swinging angle of the first galvanometer corresponding to the target point in the Q calibrating selected-regions according to the target point and the first correspondence.

17. The device for adjusting swinging of a galvanometer of claim 16, wherein in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer, to determine the swinging coordinate-range of the second galvanometer in the reference coordinate system, the one or more programs include instructions used for performing:

establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation.

18. The device for adjusting swinging of a galvanometer of claim 17, wherein in terms of establishing the second correspondence between the reference coordinate system of the laser processing surface and the coordinate-ranges of the swinging angles of the second galvanometer according to the coordinates of the Q swinging angles of the first galvanometer and the coordinate-ranges of the Q swinging angles of the second galvanometer based on trilinear interpolation, the one or more programs include instructions used for performing:

acquiring a coordinate of a target swinging-angle of the first galvanometer, the coordinate of the target swinging-angle of the first galvanometer being a coordinate of any one of the Q swinging angles of the first galvanometer;

acquiring W reference target-points of a calibrating selected-region corresponding to the coordinate of the target swinging-angle of the first galvanometer, and scanning and deflecting, by using the second galvanometer, the measuring light to make the measuring light reach the W reference target-points to obtain W detection angles, wherein W is an integer greater than 1;

establishing a second functional relationship between the coordinate of the target swinging-angle of the first galvanometer and the W reference target-points; and establishing the second correspondence between the reference coordinate system of the laser processing surface and the coordinate-ranges of the swinging angles of the second galvanometer according to the W detection angles, the second functional relationship, and the coordinate-ranges of the swinging angles of the second galvanometer corresponding to the coordinate of the target swinging-angle of the first galvanometer based on trilinear interpolation.

19. A non-transitory computer-readable storage medium, the computer-readable storage medium being configured to store a computer program used for performing electronic data interchange, wherein the computer program enables a computer to perform:

guiding processing laser to a laser processing surface via a first galvanometer, and establishing a first correspondence between a reference coordinate system of a laser processing surface and coordinate-ranges of swinging angles of the first galvanometer;

performing region division on the laser processing surface in the reference coordinate system to obtain P calibrating selected-regions of the laser processing surface, wherein P is an integer greater than 1;

determining target points in Q calibrating selected-regions in the P calibrating selected-regions, and determining a coordinate of a swinging angle of the first galvanometer corresponding to one of the target points in the Q calibrating selected-regions according to the first correspondence, to obtain coordinates of Q swinging angles of the first galvanometer, wherein Q is an integer greater than 1 and less than or equal to P;

guiding measuring light to the laser processing surface via a second galvanometer and the first galvanometer adjusted according to the Q swinging angles of the first galvanometer, and determining coordinate-ranges of Q swinging angles of the second galvanometer; and establishing a second correspondence between the reference coordinate system of the laser processing surface and coordinate-ranges of swinging angles of the second galvanometer according to the coordinates of the Q swinging angles of the first galvanometer and the coordinate-ranges of the Q swinging angles of the second galvanometer, to determine a swinging coordinate-range of the second galvanometer in the reference coordinate system.

20. The non-transitory computer-readable storage medium of claim 19, wherein in terms of performing region division on the laser processing surface in the reference coordinate system to obtain the P calibrating selected-regions of the laser processing surface, the computer program enables the computer to perform:

dividing the laser processing surface into four quadrants by taking a first preset center-point as a coordinate origin, a scanning direction of an X mirror as an x axis, and a scanning direction of a Y mirror as a y axis, and dividing equally a surface in any one quadrant into M*M squares, wherein each square corresponds to one calibrating selected-region, and M is an integer greater than 1; or dividing the laser processing surface into three-dimensional octants by taking a second preset center-point as a coordinate origin, a scanning direction of an X mirror as an x axis, a scanning direction of a Y mirror as a y axis, and a direction perpendicular to the surface as a z axis, and dividing equally a surface in any one quadrant in x-y plane into N*N squares and setting a height in the z axis to obtain N*N cuboids, wherein each cuboid corresponds to one calibrating selected-region.

* * * * *